United States Patent [19]

Oglesby et al.

[11] Patent Number: 5,771,881
[45] Date of Patent: Jun. 30, 1998

[54] IGNITION APPARATUS AND A HEATING TOOL

[75] Inventors: Alfred P. Oglesby, Kilbride; John P. Oglesby, Anneville; Michael J. Griffin, Carlow; Damian Brett, Ashfinto; Patrick J. Brereton, Carlow; Michael P. Normanly, Pollerton; John P. Watmore, Winterbourne, all of Ireland

[73] Assignee: Oglesby & Butler Research and Development Limited, Carlow, Ireland

[21] Appl. No.: 586,668

[22] PCT Filed: Jul. 18, 1994

[86] PCT No.: PCT/IE94/00038

§ 371 Date: Jan. 16, 1996

§ 102(e) Date: Jan. 16, 1996

[87] PCT Pub. No.: WO95/02788

PCT Pub. Date: Jan. 26, 1995

[30] Foreign Application Priority Data

Jul. 16, 1993 [IE] Ireland .................................. S93 0529

[51] Int. Cl.⁶ ...................................................... B23K 3/02
[52] U.S. Cl. ........................... 126/414; 126/413; 431/255; 431/256
[58] Field of Search ..................................... 126/413, 403, 126/414, 405, 406, 407; 431/328, 354, 355, 344, 345, 329, 268, 255, 256

[56] References Cited

U.S. PATENT DOCUMENTS

| 4,502,465 | 3/1985 | Yoshinaga | ................................ 126/409 |
| 4,641,632 | 2/1987 | Nakajima . | |
| 4,785,793 | 11/1988 | Oglesby et al. | ......................... 126/414 |
| 4,805,593 | 2/1989 | Hsu | .......................................... 126/414 |
| 5,215,076 | 6/1993 | Oglesby et al. | ......................... 126/413 |

FOREIGN PATENT DOCUMENTS

| 0100060 | 2/1984 | European Pat. Off. . |
| 3526927 | 1/1986 | Germany . |
| WO9312377 | 6/1993 | WIPO . |

*Primary Examiner*—James C. Yeung
*Attorney, Agent, or Firm*—Sughrue, Mion, Zinn, Macpeak & Seas, PLLC

[57] ABSTRACT

A soldering tool (1) comprising a main housing (2) within which is located a fuel gas reservoir (4). A soldering body member (5) terminates in a rearwardly extending combustion chamber (11) within which is located a gas catalytic combustion element (14). A gas/air mixture is delivered through a jet outlet (21) where it is initially burnt with a flame in a flame combustion chamber (24) for raising the catalytic combustion element (14) to its ignition temperature. A piezoelectric ignition element (50) provides a spark across a spark gap (56) adjacent an electrode (55) for igniting the gas/air mixture to burn with a flame. An interrupt member (67) located downstream of a nozzle bore (28) temporarily interrupts the flow of fuel gas to the jet outlet (21) for extinguishing the flame after the catalytic combustion element (14) has been raised to its ignition temperature. A slidable actuator member (60) in the housing (2) sequentially operates the piezoelectric ignition element (50) and the interrupt member (67).

19 Claims, 9 Drawing Sheets

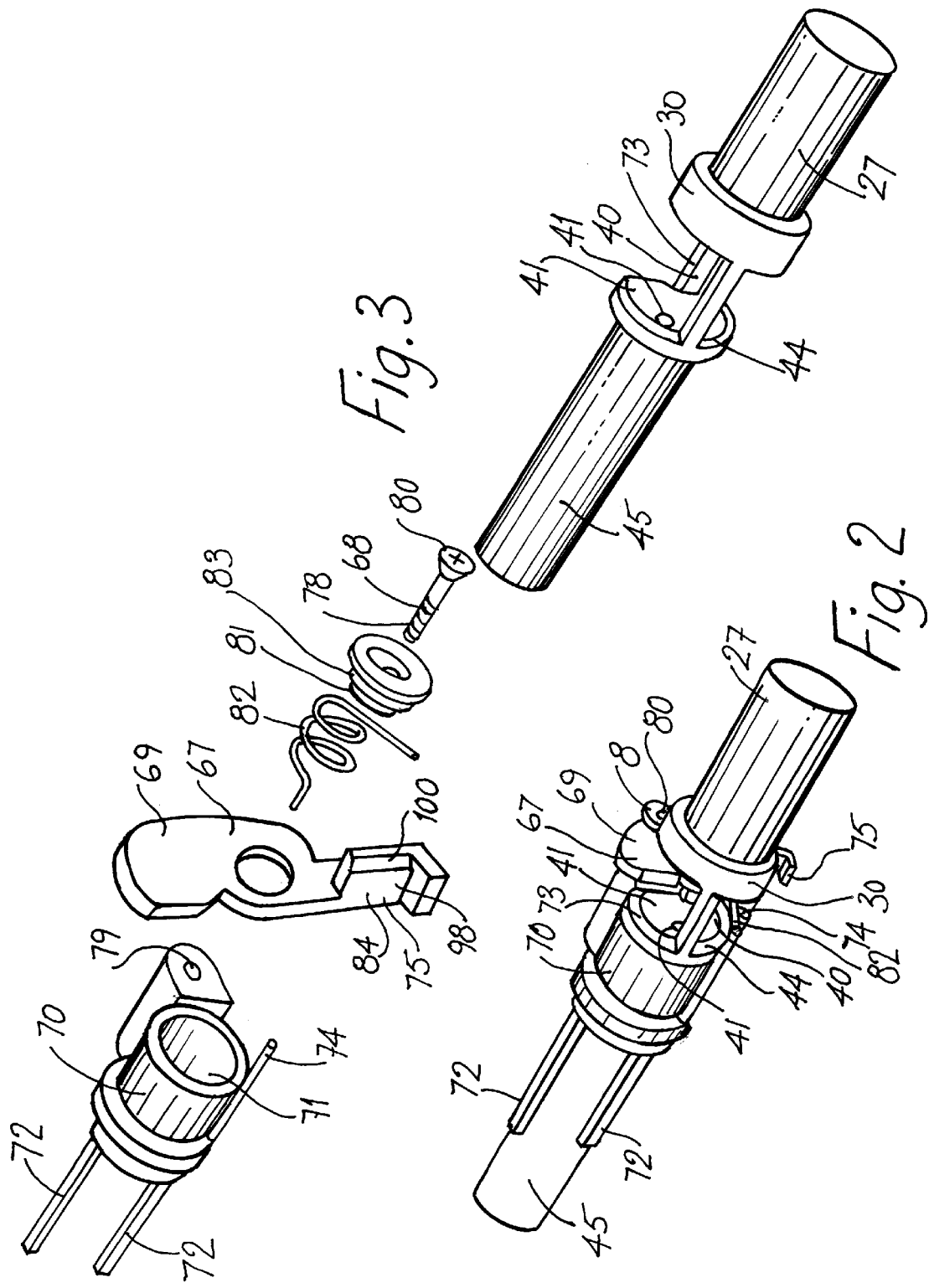

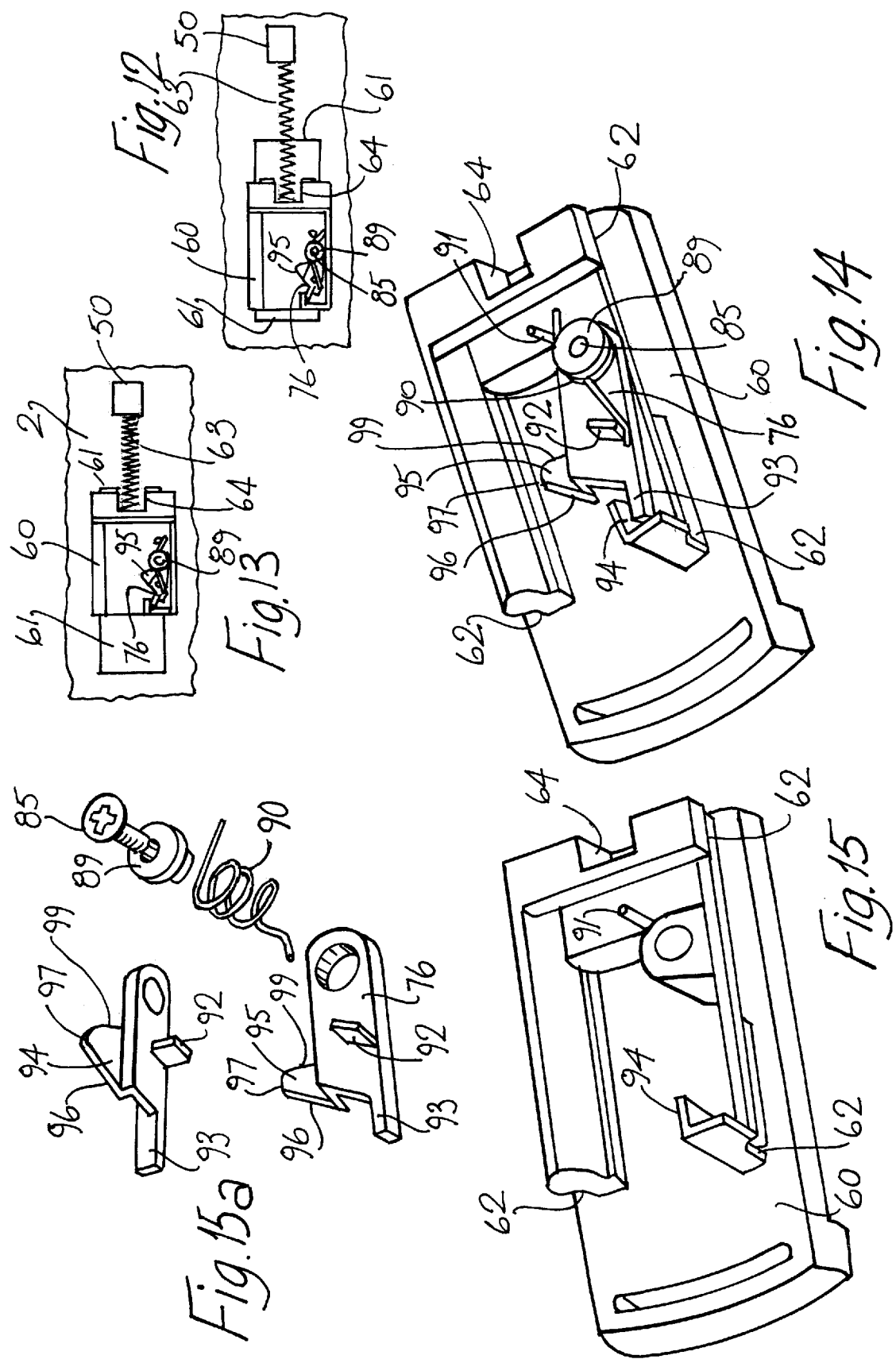

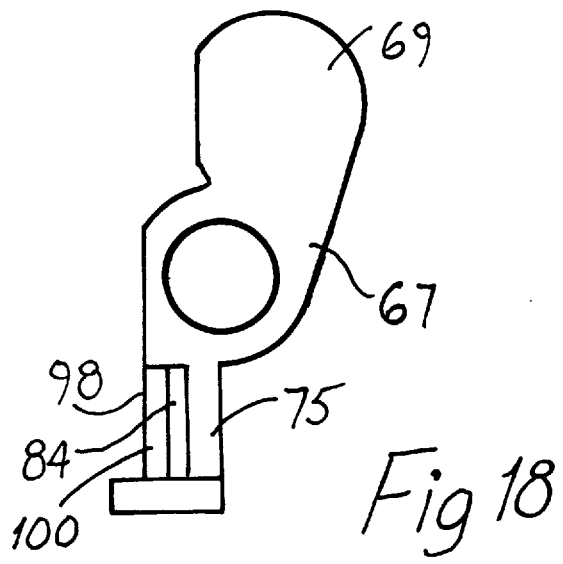
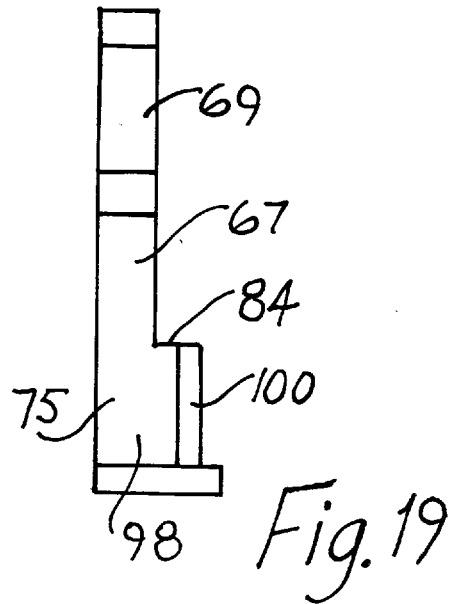
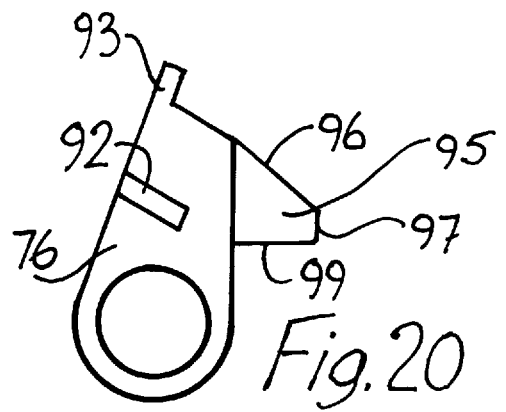
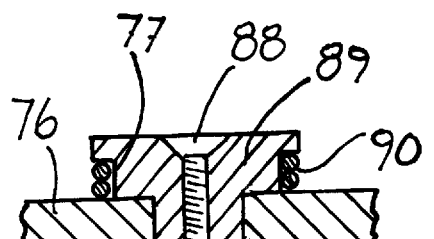
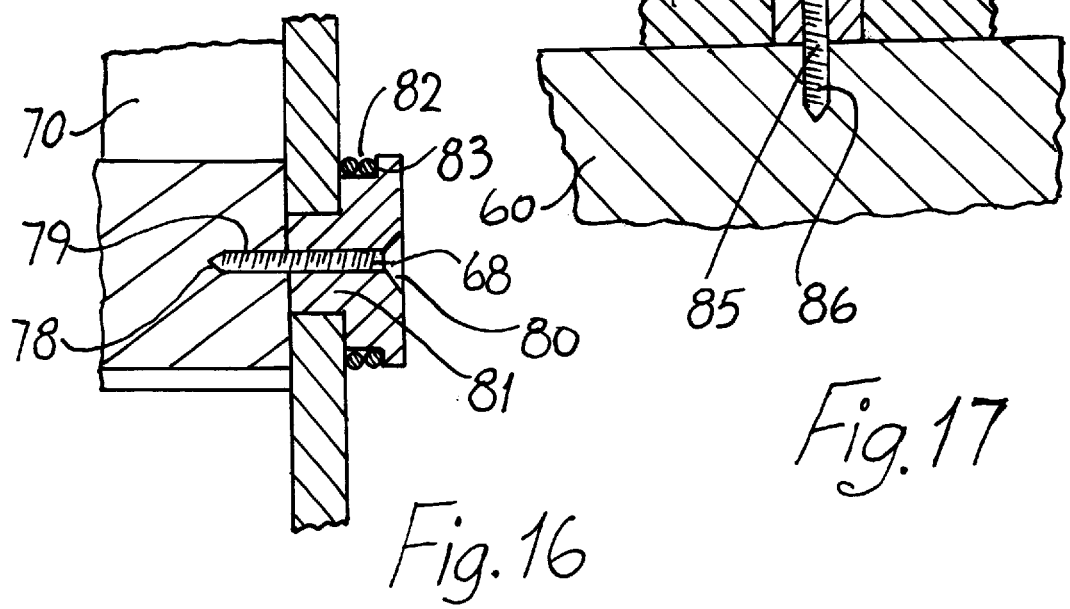

IGNITION APPARATUS AND A HEATING TOOL

BACKGROUND OF THE INVENTION

The present invention relates to an ignition apparatus for igniting a gas catalytic combustion element, and the invention also relates to a gas powered heating tool comprising the ignition apparatus. In particular, the invention relates to but is not limited to a portable hand held gas powered soldering tool which comprises the ignition apparatus, although needless to say, the invention is not limited to a soldering tool.

Gas powered heating tools, and in particular, gas powered soldering tools in which a gas/air mixture is converted to heat by flameless combustion in a gas catalytic combustion element are known. For example, a hand held gas powered soldering tool is described in European Patent Specification No. EP-A-0,118,282. In the gas powered heating tool disclosed in this European specification, the soldering tool comprises a handle housing onto which a soldering body portion is connected. A combustion chamber housing extends rearwardly from the soldering body portion towards the handle housing and houses a gas catalytic combustion element. A gas/air mixture is delivered into the combustion chamber and passes through the catalytic combustion element. To ignite the catalytic combustion element, in other words, to raise the temperature of the catalytic combustion element to its ignition temperature, it is necessary initially to allow the gas/air mixture to pass into the combustion chamber and through the catalytic combustion element, and in turn through an exhaust port from the combustion chamber. The exhausting gas/air mixture is ignited and burns with a flame in the exhaust port. The root of the flame raises the temperature of a local portion of the catalytic combustion element to its ignition temperature and thereafter, the catalytic combustion element commences to convert the gas/air mixture to heat by flameless combustion. Once the entire catalytic combustion element is at its ignition temperature, the flame in the exhaust port extinguishes. While this construction of soldering tool is quite adequate, a disadvantage of the soldering tool is that in order to ignite the catalytic combustion element, it is necessary to manually ignite the gas/air mixture to burn with a flame in the exhaust port. This requires a flint, match or other suitable means for igniting the gas/air mixture. To minimise this inconvenience, the soldering tool disclosed in this European specification is provided with a cap in which a flint igniter is located for manually igniting the gas/air mixture. However, this does not overcome the problem that a separate operation is required for igniting the gas/air mixture to raise the combustion element to its ignition temperature.

A hand held gas powered soldering tool is sold under the trade name SUGAMOTO supplied by Radio Spares of Great Britain, in which the soldering tip portion is heated with a gas catalytic combustion element, and which also comprises a piezo electric ignition element for use in raising the temperature of the gas catalytic combustion element to its ignition temperature. The piezo electric ignition element is manually operated by an operating button located in the handle of the soldering tool for igniting the fuel gas to burn with a flame which is played on the gas catalytic combustion element for raising the temperature of the gas catalytic combustion element to its ignition temperature. However, in order to extinguish the flame after the gas catalytic combustion element has been raised to its ignition temperature, it is necessary to operate the gas supply on/off switch of the soldering tool for switching off the gas for in turn extinguishing the flame. Once the flame has been extinguished, the on/off switch is again operated to reinstate a flow of fuel gas to the catalytic combustion element.

This gas powered soldering tool suffers from a number of disadvantages. In particular, the operation of the soldering tool is relatively complicated, and furthermore, difficulty can be experienced in synchronising the operation of the piezo electric ignition element and the on/off switch in order to get the gas catalytic combustion element to burn with flameless combustion. Considerable difficulty, in general, is experienced in determining precisely how long the on/off gas supply switch should be retained in the off position for extinguishing the flame. Should the on/off switch be retained in the off position for too lengthy a period, while the flame will be extinguished, by the time the fuel gas flow is reinstated to the gas catalytic combustion element, the temperature of the gas catalytic combustion element may have dropped below its ignition temperature, and thus will not convert gas to heat with flameless combustion. In which case, the operation of raising the gas catalytic combustion element to its ignition temperature must be repeated. It has been found that many attempts may be required before the gas catalytic combustion element will operate to convert gas to heat flamelessly. Alternatively, should the on/off switch be operated to switch off the gas for an insufficient period of time, the flame will remain burning, thereby preventing the delivery of the fuel gas to the gas catalytic combustion element. Furthermore, because extinguishing the flame requires manual operation of the on/off switch, the flame may be allowed to play on the catalytic combustion element for too lengthy a period, which can adversely affect the life of the catalytic combustion element.

U.S. Pat. No. 4,920,952 discloses a gas powered soldering tool in which a gas catalytic combustion element located in a combustion chamber extending from a soldering body member is brought to its ignition temperature by a flame which is subsequently extinguished. A gas/air mixture is delivered into the combustion chamber and a piezo electric ignition element is provided for initially igniting the gas/air mixture to burn with a flame for raising the temperature of the gas catalytic combustion element to its ignition temperature. A thumb operated button is located in a handle housing of the soldering tool, which on depression operates the piezo electric ignition element. The thumb operated button is also connected to a shutter mechanism which controls the flow of air to the fuel gas stream. On release of the operating button, the shutter is operated to temporarily starve the fuel gas stream of air for extinguishing the flame when the combustion element has been raised to its ignition temperature. On the flame being extinguished, the air flow to the gas stream is reinstated and the catalytic combustion element commences to convert the gas to heat by flameless combustion. While, in general, the ignition apparatus for igniting this soldering tool is reliable, in certain cases, it is unreliable, since under certain operating conditions, sufficient air may be received into the combustion chamber through other ports to maintain the flame even when the shutter is operated, and is preventing air entering the fuel gas stream. Thus, in certain cases, difficulty can be experienced in extinguishing the flame after the combustion element has been raised to or above its ignition temperature.

U.S. Pat. No. 5,215,456 discloses a gas powered soldering tool in which the gas catalytic combustion element is raised to its ignition temperature by burning a gas/air mixture with a flame. The gas/air mixture is delivered through a jet and in turn through a diffuser from which the gas/air mixture is initially ignited to burn with a flame by a piezo electric ignition element. The diffuser is carried on a bi-metal strip. The flame heats the combustion element and raises it to its ignition temperature. Simultaneously, while the combustion element is being raised to its ignition temperature, the flame heats the bi-metal strip which causes the diffuser to be urged away from the jet from which the gas/air mixture is issuing. Once the diffuser is moved away from the jet, the rate of flow of the gas/air mixture from the jet is sufficiently great to blow out the flame. The gas/air mixture then continues on to the catalytic combustion element which commences to convert the gas to heat by flameless combustion. This ignition arrangement for raising the temperature of the combustion element to its ignition temperature has been found to be not always satisfactory.

U.S. Pat. No. 4,726,767 discloses a hot air blow torch. The air is heated by a gas catalytic combustion element. The combustion element is raised to its ignition temperature by igniting a gas/air mixture to burn with a flame adjacent the catalytic combustion element using a piezo electric ignition element. On the flame raising the temperature of the gas catalytic combustion element to its ignition temperature, the flame is extinguished by increasing the velocity of air flowing with the gas so that the flame is blown out. The ignition arrangement used in the device of this U.S. specification is rather complex and cumbersome and not always satisfactory.

There is therefore a need for an ignition apparatus for raising the temperature of a gas catalytic combustion element to its ignition temperature so that after the gas catalytic combustion element has been raised to its ignition temperature, the gas catalytic combustion element will commence to convert the gas to heat by flameless combustion which overcomes the problems of known ignition apparatus. There is also a need for a gas powered heating tool which comprises such ignition apparatus.

SUMMARY OF THE INVENTION

The present invention is directed towards providing such ignition apparatus, and also for providing a gas powered heating tool comprising the ignition apparatus.

According to the invention, there is provided ignition apparatus for a gas catalytic combustion element for raising the temperature of the gas catalytic combustion element to its ignition temperature, the apparatus comprising a jet means for delivering fuel gas to the gas catalytic combustion element in gaseous form, and for delivering a flame to the gas catalytic combustion element for raising the temperature of the gas catalytic combustion element to its ignition temperature, an ignition means adjacent the jet means for igniting fuel gas from the jet means to burn with a flame, an actuator means for operating the ignition means, and a flame extinguishing means for extinguishing the flame, wherein the flame extinguishing means comprises an interrupt means for temporarily interrupting the flow of fuel gas to the jet means for extinguishing the flame, and the actuator means is operable for sequentially operating the ignition means and the interrupt means.

Ideally, the actuator means is operable in a first direction for operating the ignition means and is operable in a reverse second direction for operating the interrupt means.

Preferably, the interrupt means is located upstream of the jet means adjacent a fuel gas stream in gaseous form which supplies the jet means, the interrupt means being movable from an idle position spaced apart from the fuel gas stream to an interrupt position whereby the interrupt means extends into the fuel gas stream for interrupting the gas stream flow.

In one aspect of the invention, the actuator means co-operates with the interrupt means with a ratchet type action so that movement of the actuator means in the first direction for operating the ignition means leaves the interrupt means substantially undisturbed in the idle position, and movement of the actuator means in the second direction operates the interrupt means. Preferably, a ratchet member is carried on the actuator means, the ratchet member being engagable with the interrupt means when the actuator means is being moved in the second direction for moving the interrupt means from the idle position to the interrupt position. Advantageously, the ratchet member is movably mounted on the actuator means and is urged into an operable position for engaging the interrupt means on the actuator means being moved in the second direction, the ratchet member being movable from the operable position to an inoperable position on engagement with the interrupt means on the actuator means being moved in the first direction for leaving the interrupt means substantially undisturbed in the idle position.

Ideally, the ratchet member is spring urged into the operable position.

In another aspect of the invention, the interrupt means is spring urged into the idle position.

Preferably, the urging force urging the ratchet member into the operable position is less than the urging force urging the interrupt means into the idle position so that on the ratchet member engaging the interrupt means on the actuator means being moved in the first direction the ratchet member is moved into the inoperable position.

Ideally, the ratchet member is pivotally mounted on the actuator means. Preferably, the interrupt means is pivotally mounted about a pivot axis extending substantially parallel to the fuel gas stream and spaced apart therefrom, and is pivotal about the pivot axis from the idle position to the interrupt position.

In one aspect of the invention, the interrupt means comprises a plate member extending transversely relative to the fuel gas stream.

Preferably, an operating lever extends from the interrupt means for co-operating with the ratchet member for moving the interrupt means from the idle position to the interrupt position. Preferably, the operating lever and the ratchet member are provided with respective co-operating surfaces for co-operating with each other for moving the interrupt means from the idle position to the interrupt position, and for retaining the interrupt means in the interrupt position for a time period sufficient to extinguish the flame.

In another aspect of the invention, the ignition means comprises at least one electrode adjacent the jet means and an electrical power supply means for delivering an electrical power supply to the at least one electrode for causing an electrically generated spark at the electrode, the electrical power supply means being responsive to the actuator means being moved in the first direction. Preferably, the electrical power supply means comprise a piezo electric element. Advantageously, the actuator means is operably connected to the piezo electric element for compressing the piezo electric element for generating the electrical power supply, and preferably, the actuator means is connected to the piezo electric element through a compression spring.

Ideally, the jet means is of electrically conductive material, and is electrically connected to the electrode and the means, the electrode and the jet means forming a spark gap across which the spark jumps.

In another aspect of the invention, the ignition apparatus comprises a housing, the jet means, the ignition means and the interrupt means being located in the housing, the actuator means being provided by an actuator member slidably mounted in the housing and accessible externally of the housing for operating the ignition means and the interrupt means.

Preferably, a nozzle means is provided for supplying the fuel gas stream in gaseous form into a pipe means for supply to the jet means, the interrupt means being located adjacent the nozzle means and slightly downstream thereof. Advantageously, the pipe means is spaced apart from the nozzle means, and the interrupt means is located adjacent the nozzle means, and extends between the nozzle means and the pipe means in the interrupt position. Preferably, air is drawn into and mixed with the fuel gas stream intermediate the nozzle means and the pipe means.

Additionally, the invention provides a gas powered heating tool comprising a working body member of heat conductive material, a combustion chamber housing extending from the working body member forming a combustion chamber, a gas inlet being provided to the combustion chamber and an exhaust gas outlet being provided from the combustion chamber, a gas catalytic combustion element being mounted in the combustion chamber, wherein the heating tool further comprises the ignition apparatus according to the invention for raising the temperature of the gas catalytic combustion element to its ignition temperature, the jet means of the ignition apparatus being located for delivering the fuel gas and the flame into the combustion chamber to the gas catalytic combustion element.

Preferably, the jet means is located upstream of the gas inlet to the combustion chamber. Advantageously, the jet means delivers a fuel gas/air mixture into the combustion chamber.

In one aspect of the invention, the gas powered heating tool comprises a handle, the working body member being connected to the handle. Preferably, a fuel gas supply means is provided in the handle. Advantageously, the fuel gas supply means comprises a fuel gas reservoir. Ideally, the fuel gas reservoir is rechargeable.

In a further aspect of the invention, a control means for controlling the flow of fuel gas to the nozzle means is provided. Preferably, the control means is located in the handle. Ideally, the ignition apparatus is located in the handle.

In one aspect of the invention, the working body member comprises a soldering body portion, the combustion chamber housing extending rearwardly from the soldering body portion, and in another aspect of the invention, the working body member comprises a receiving chamber for receiving and melting a hot melt adhesive.

The advantages of the invention are many. By virtue of the fact that the interrupt means temporarily interrupts the flow of fuel gas to the jet means, extinguishing of the flame is ensured, provided of course that the flow of fuel gas is temporarily interrupted for a period sufficiently long for the purpose of extinguishing the flame. Because of the fact that it is the flow of fuel gas which is being interrupted, the length of time the interrupt means must interrupt the fuel gas flow is relatively short, thereby providing an ignition apparatus which ignites the combustion element relatively rapidly. Furthermore, by virtue of the fact that the interrupt means interrupts the flow of fuel gas for the purpose of extinguishing the flame, a particularly simple and convenient construction of ignition apparatus can be provided. In cases where the fuel gas stream in gaseous form is being interrupted, the time period during which the fuel gas stream must be interrupted to extinguish the flame is even shorter, and an even more simplified interrupt means can be provided. By virtue of the fact that the actuator means sequentially operates the ignition means and the interrupt means, operation of the ignition apparatus and the heating tool is particularly simplified. The provision of the interrupt means by an interrupt plate which is operated by the actuator means with a ratchet type mechanism is a particularly advantageous arrangement of interrupt means.

BRIEF DESCRIPTION OF THE DRAWINGS

The invention will be more clearly understood from the following description of a preferred embodiment thereof, which is given by way of example only, with reference to the accompanying drawings, in which:

FIG. 2 is a perspective view of a detail of the soldering tool of FIG. 1, FIG. 3 is an exploded perspective view of the detail of FIG. 2, FIG. 10 is a transverse cross-sectional view of part of the portion of FIG. 4 viewed from the opposite direction, FIG. 11 is a view similar to FIG. 10 with a part of the portion in a different position, FIG. 12 is a plan view of another detail of the soldering tool of FIG. 1 with part of the detail shown partly in block representation, FIG. 13 is a view similar to FIG. 12 showing part of the detail in a different position, FIG. 14 is a perspective view of another portion of the soldering tool of FIG. 1, FIG. 15 is an exploded view of the portion of FIG. 14, FIG. 15a is a perspective view of a detail of the portion of FIG. 14, FIG. 16 is a sectional side elevational view of another detail of the soldering tool of FIG. 1, FIG. 17 is a sectional side elevational view of a further detail of the soldering tool of FIG. 1, FIG. 18 is an end elevational view of another portion of the soldering tool of FIG. 1, FIG. 19 is a side elevational view of the portion of FIG. 18, FIG. 20 is a plan view of another portion of the soldering tool of FIG. 1, and FIG. 21 is an end elevational view of another portion of the soldering tool of FIG. 1.

DETAILED DESCRIPTION OF THE INVENTION

Figure 1:
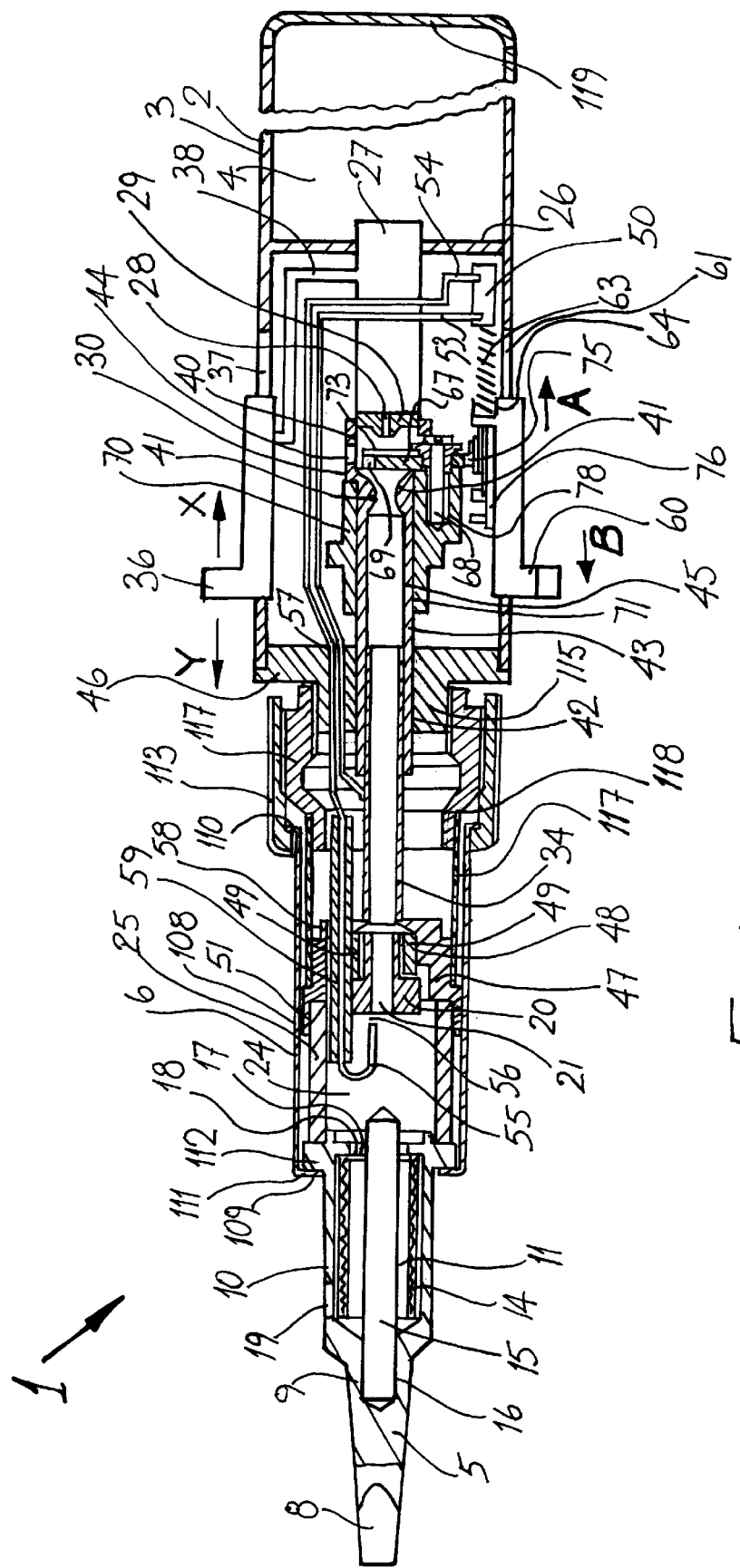
FIG. 1 is a longitudinal cross-sectional view of a gas powered soldering tool according to the invention which incorporates ignition apparatus, also according to the invention.
Figure 4:
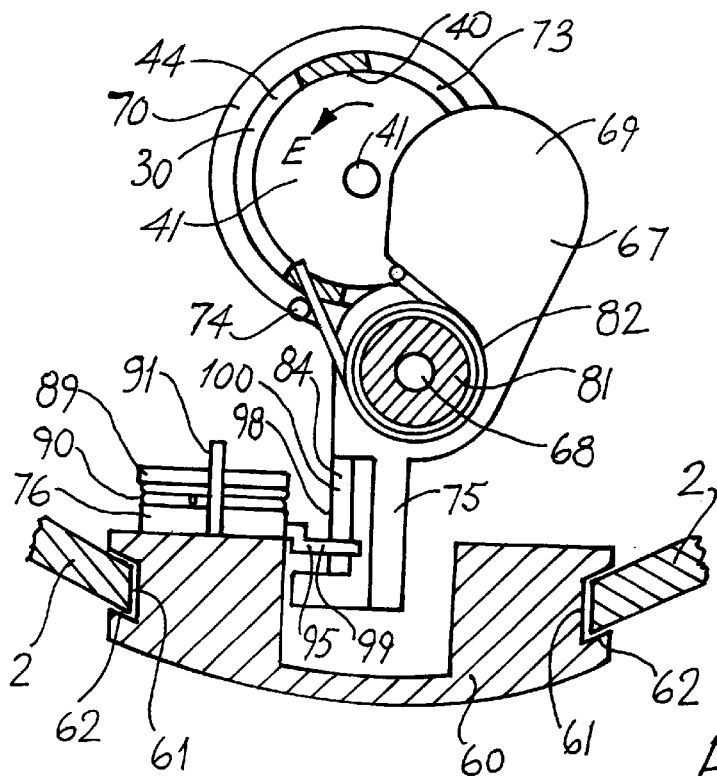
FIG. 4 is a transverse cross-sectional view of a portion of the soldering tool of FIG. 1.
Figure 5:
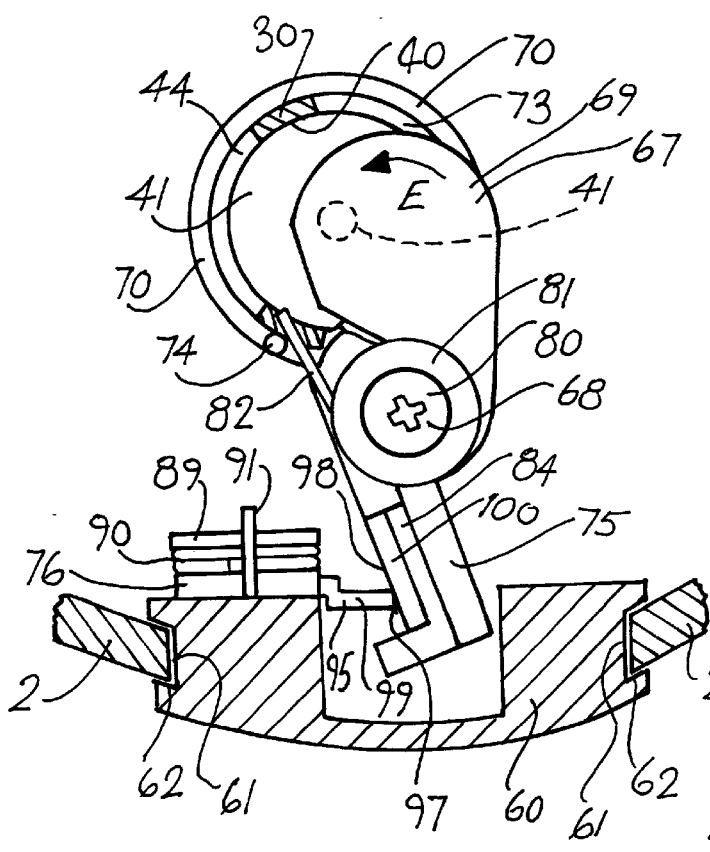
FIG. 5 is a view similar to FIG. 4 with part of the portion in a different position.

Referring to the drawings there is illustrated a gas powered heating tool, in this case, a portable hand held gas powered soldering tool according to the invention which is indicated generally by the reference numeral 1. The soldering tool 1 comprises a main housing 2 of hollow circular cross-section of injection moulded plastics material. The main housing 2 forms an elongated handle 3 within which is located a fuel gas supply means, namely, a rechargeable liquid fuel gas reservoir 4. A heated working body member, namely, a soldering body member 5 is connected to the main housing 2 by a tip retention housing 6 which extends axially between the main housing 2 and the soldering body member 5 as will be described below. The soldering body member 5 is of circular cross-section and of a heat conductive material, namely, nickel on iron plated copper, and terminates at one end in a solid soldering tip 8. The other end of the soldering body member 5 extends rearwardly at 9 and forms a hollow combustion chamber housing 10 which forms a combustion chamber 11 of circular cross-section. The combustion chamber housing 10 is also of nickel plated copper and is formed integrally with the soldering body member 5 by machining.

A gas catalytic combustion element 14 which comprises a perforated metal substrate of cylindrical shape carrying a catalytic material deposited thereon is located in the combustion chamber 11 for converting fuel gas to heat by flameless combustion. A spigot 15 of solid circular cross-section and of heat conductive material, namely, copper is secured by means of an interference fit in a bore 16 in the soldering body member 5, and extends into the combustion chamber 11 co-axially with the combustion element 14 for conducting heat from the combustion element 14 and the combustion chamber 11 into the soldering body member 5, and in turn, to the soldering tip 8. Heat is also conducted through the combustion chamber housing 10 into the soldering tip 8. The combustion chamber housing 10 is open at 17 to form a gas inlet 18 for receiving fuel gas to the combustion element 14 as will be described below. An exhaust gas outlet 19 is provided from the combustion chamber 11 adjacent the end 9 for exhausting burnt gas from the combustion chamber 11.

A jet means comprising a jet housing 20 having a jet outlet 21 is located in the tip retention housing 6 for delivering a mixture of fuel gas in gaseous form and air through the gas inlet 18 into the combustion chamber 11 for conversion to heat by the combustion element 14. The jet outlet 21 extends axially relative to the tip retention housing 6. The gas/air mixture is delivered from the jet outlet 21 through a flame combustion chamber 24, where it is initially burnt with a flame which is directed through the gas inlet 18 into the combustion chamber 11 for raising the temperature of the combustion element 14 to or above its ignition temperature as will be described below. On the combustion element 14 reaching or exceeding its ignition temperature, the flame is extinguished and the gas/air mixture flowing from the jet outlet 21 is reinstated and flows through the flame combustion chamber 24 into the combustion chamber 11 where it is converted to heat by flameless combustion by the combustion element 14 having reached its ignition temperature. A sleeve 25 of circular cross-section extending between the jet housing 20 and the combustion chamber housing 10 forms the flame combustion chamber 24.

A control means, namely, a gas supply control mechanism 27 which is illustrated in block representation in FIG. 1 receives fuel gas in liquid form from the reservoir 4, and delivers a stream of fuel gas in gaseous form through a nozzle bore 28 extending axially through a nozzle housing 29 of brass which is carried in the gas supply control mechanism 27. The fuel gas stream is delivered from the nozzle bore 28 into a venturi housing 30 also located in the main housing 2. Air is mixed with the gas stream in the venturi housing, and the gas/air mixture is delivered from the venturi housing 30 through a pipe means, namely, an axially extending pipe 34, to the jet housing 20 as will be described in more detail. The gas supply control mechanism is located within the main housing 2 and extends axially through and from a dividing wall 26 which isolates the reservoir 4 from the remainder of the main housing 2. A series of filters, restrictors and orifices (none of which are shown) are located in the gas supply control mechanism 27 for filtering and vaporizing the fuel gas. An isolating valve (also not shown) is also provided in the gas supply control mechanism 27 for switching on and off the supply of gas to the nozzle bore 28 and in turn to the jet outlet 21. Such arrangements of filters, restrictors, orifices and isolating valves in a gas supply control mechanism will be well known to those skilled in the art, and it is not intended to describe them or the gas supply control mechanism 27 in further detail. An operating slider 36 of plastics material is slidable axially in an elongated axially extending slot 37 in the main housing 2 and is operably connected to the isolating valve (not shown) in the gas supply control mechanism 27 for operating the isolating valve (not shown) for switching on and off the supply of fuel gas. An operable connection 38 between the operating slider 36 and the gas supply control mechanism 27 is illustrated in block representation in FIG. 1. Movement of the operating slider 36 in the direction of the arrow X switches on the supply of fuel gas and movement in the direction of the arrow Y switches off the fuel gas, see FIG. 10. However, the operation of such an operating slider for operating an isolating valve of a gas supply control mechanism is described and illustrated in European Patent Specification No. EP-A-0,118,282.

The venturi housing 30 is of brass and is provided with an axially extending main parallel bore 40 which engages the nozzle housing 29 with an interference type fit for locating and securing the venturi housing 30 to the gas supply control mechanism 27. A tapered venturi bore 41 extends from the main bore 40 and terminates in a parallel bore 43 extending through a tubular member 45 of circular cross-section which is formed integrally with the venturi housing 30. The diameter of the bore 43 is less than the diameter of the main bore 40 and is axially aligned with the main bore 40. The tubular member 45 extends through and is located axially in a circular bore 42 in an end cap 46 of the main housing 2, see FIG. 1. The end cap 46 is secured in the main housing 2 by screws (not shown). The gas supply control mechanism 27, the nozzle housing 29 and the venturi housing 30 are rigidly secured together and are supported co-axially in the main housing 2 by the dividing wall 26 and the end cap 46. A carrier housing 70 of injection moulded plastics material having a circular bore 71 extending therethrough extends around the tubular member 45, see FIGS. 1 to 3. The carrier housing 70 is keyed to the tubular member 45 by respective keying flats (not shown) to prevent rotation of the carrier housing 70 relative to and around the tubular member 45. A pair of keying fingers 72 formed integrally with the carrier housing 70 extend along the tubular member 45 and engage keying grooves 52 extending from the bore 42 in the end cap 46, see FIG. 21, for preventing any rotational movement of the carrier housing 70, and in turn, the venturi housing 30 relative to the main housing 2 for a purpose to be described below.

Air inlet slots 44 and 73 in the venturi housing 30 accommodate air into the main bore 40 and the tapered bore 41 for mixing with the fuel gas stream from the nozzle bore 28. The supply pipe 34 extends from the bore 43 for delivering the gas/air mixture to the jet housing 20. The supply pipe 34 terminates in a jet housing carrier 47 of circular cross-section which is located within the tip retention housing 6. A circular bore 48 extends into the jet housing carrier 47 for receiving the jet housing 20. The bore 48 is axially aligned with the supply pipe 34. A burner baffle 49 formed by a circular sleeve is located in the bore 48, and the jet housing 20 is in turn located in the burner baffle 49. The gas/air mixture is delivered from the gas supply pipe 34 into and through the jet outlet 21 in the jet housing 20, and also through the burner baffle 49, and exits annularly around the jet housing 20 for stabilising the flame when the gas/air mixture issuing through the jet outlet 21 is burning with a flame. A bore 51 of larger diameter extends into the jet housing carrier 47 for accommodating the sleeve 25.

Ignition apparatus also according to the invention is provided for igniting the gas/air mixture from the jet outlet 21 to burn with a flame in the flame combustion chamber 24 for raising the temperature of the combustion element 14 to its ignition temperature, and for in turn, extinguishing the flame when the combustion element 14 has reached its ignition temperature, so that the combustion element 14 continues to flamelessly convert the gas to heat. The ignition apparatus comprises an ignition means which comprises an electrical power supply means, namely, a piezo electric ignition element 50 which is located in the main housing 2 and is illustrated in block representation in FIGS. 1, 12 and 13 for igniting the gas/air mixture to burn with a flame. Such piezo electric ignition elements will be well known to those skilled in the art, and it is not intended to describe the piezo electric element in further detail. The gas supply pipe 34, the jet housing carrier 47, the burner baffle 49 and the jet housing 20 are all of electrically conductive material, and the gas supply pipe 34 is electrically connected to one pole of the piezo electric ignition element 50 by an electrical connection 53. The other pole of the piezo electric ignition element 50 is connected by an electrical conductor 54 to an electrode 55 which forms a spark gap 56 with the jet housing 20 across which a spark is provided for igniting the gas/air mixture issuing from the jet outlet 21 and through the burner baffle 49. Ignition of the gas/air mixture to burn with a flame is also aided by the spigot 15 which extends slightly into the flame combustion chamber 24 for slowing down and distributing the gas/air mixture. A bore 57 through the end cap 46 accommodates the conductors 53 and 54. A bore 58 through the jet housing carrier 47 accommodates the electrical conductor 54 through the carrier 47. An insulating sleeve 59, a portion of which is illustrated in FIG. 1, of electrically insulating material is provided around the conductor 54 for electrically isolating the conductor 54 from the jet housing 20, the jet housing carrier 47, the end cap 46 and the conductor 53.

Figure 6:
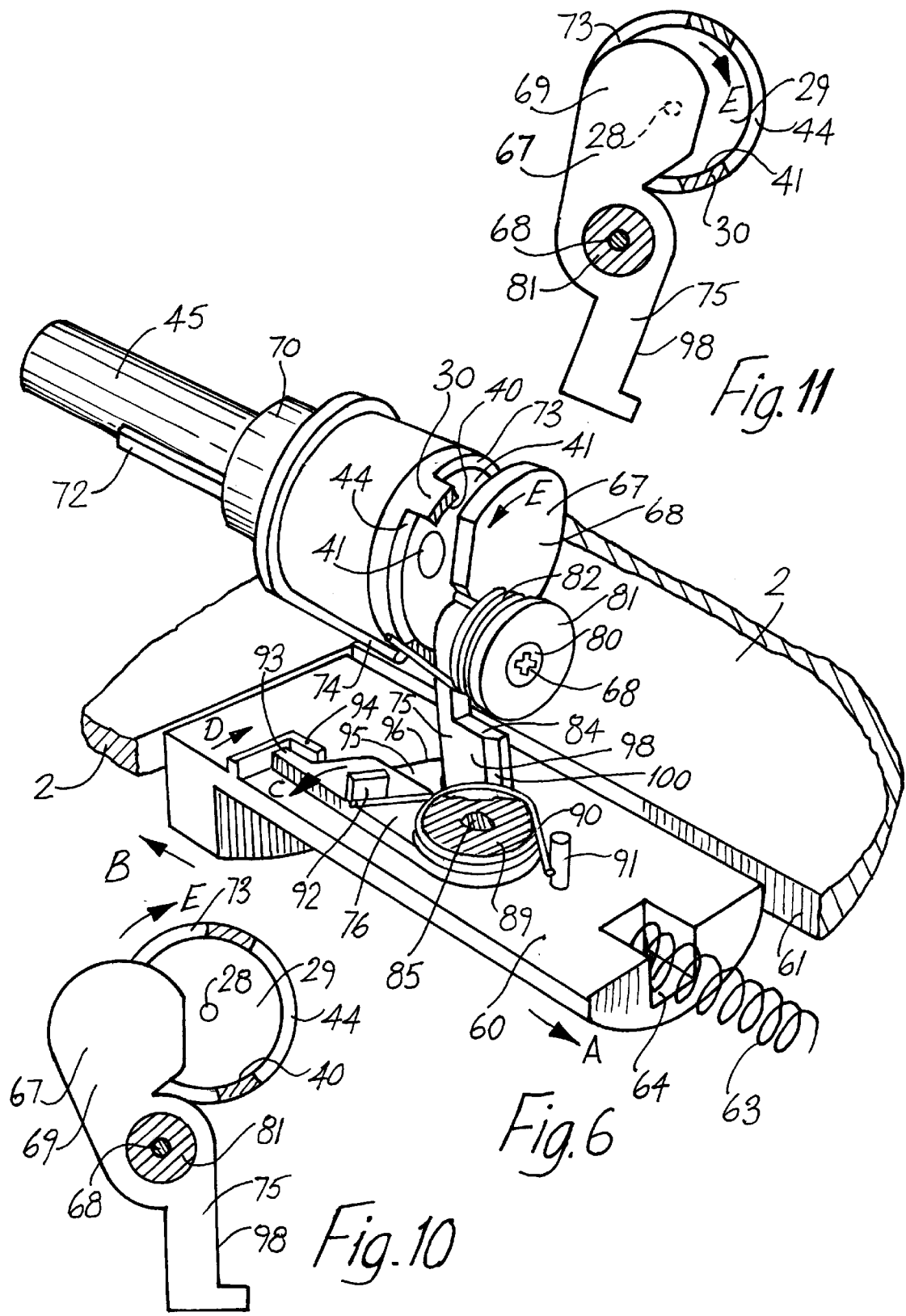
FIG. 6 is a perspective view of the portion of FIG. 4 in one position, with part of the portion illustrated diagrammatically.

An actuator means for activating the piezo electric ignition element 50 for generating electrical power for generating the spark across the gap 56 comprises a thumb operated actuator member 60 of plastics material which is axially slidable in the main housing 2 in an elongated axially extending slot 61. Side grooves 62 on opposite sides of the actuator member 60 slidably engage the housing 2 on each side of the slot 61. The actuator member 60 is illustrated in FIGS. 4, 5, 14 and 15, and is diagrammatically illustrated in FIGS. 1, 6 to 9, 12 and 13. The actuator member 60 is slidable from a first position illustrated in FIGS. 1, 6 and 12 in a first direction, namely, in the direction of the arrow A to a second position illustrated in FIGS. 8 and 13 for operating the piezo electric ignition element 50. A compression spring 63 is engaged in a recess 64 in the actuator member 60, and acts between the piezo electric ignition element 50 and the actuator member 60 for operably engaging and operating the piezo electric ignition element 50 on the slider member 50 being moved in the direction of the arrow A from the first position to the second position. The compression spring 63 is of sufficient strength so that just as the actuator member 60 commences to compress the spring 63 when moving from the first position, the piezo electric ignition element 50 is activated for generating the spark across the spark gap 56. Additionally, the strength of the spring 63 is sufficient to return the actuator member 60 from the second to the first position in a second direction, namely, in the direction of the arrow B.

The ignition apparatus also comprises means for extinguishing the flame in the flame combustion chamber 24 after the combustion element 14 has been raised to its ignition temperature, which will now be described. The flame extinguishing means is provided by an interrupt means which comprises an interrupt member 67 of injection moulded plastics material, which is pivotally carried on a mounting screw 68 which is secured in the carrier housing 70. The interrupt member 67 comprises an interrupt plate formed by an interrupt disc 69 for temporarily interrupting the fuel gas stream issuing from the nozzle bore 28. The slot 73 in the venturi housing 30 accommodates the interrupt disc 69 into the main bore 40 of the venturi housing 30 adjacent the nozzle bore 28 but spaced apart therefrom and downstream thereof. The interrupt member 67 is pivotal about the mounting screw 68 in the direction of the arrow E from an idle position illustrated in FIGS. 4, 6 to 8 and 10 with only part of the interrupt disc 69 extending partly into the main bore 40, and well spaced apart from the fuel gas stream issuing from the nozzle bore 28, to an interrupt position illustrated in FIGS. 5, 9 and 11 with the interrupt disc 69 extending well into the main bore 40 and extending across the nozzle bore 28, and in turn, into the fuel gas stream issuing from the nozzle bore 28 for interrupting the fuel gas stream for extinguishing the flame. As will be described below, the interrupt disc 69 is pivoted into and retained in the interrupt position for a period of time sufficient for extinguishing the flame. The mounting screw 68 defines a pivot axis for the interrupt plate member 67 which is substantially parallel to the main axis of the main housing 2 and accordingly to the flow of the fuel gas stream from the nozzle bore 28.

The interrupt member 67 comprises an operating lever 75 which extends from the interrupt disc 69 on the opposite side of the mounting screw 68 for operably engaging a ratchet type mechanism, namely, a ratchet member 76, which is carried on the actuator member 60. The ratchet member 76 as will be described below is arranged so that the actuator member 60 sequentially operates the piezo electric ignition element 50 and the interrupt member 67. In other words, as the actuator member 60 is being moved from the first to the second position in the direction of the arrow A the piezo electric ignition element 50 is operated, and the interrupt member 67 remains substantially undisturbed in the idle position, and on return of the actuator member 60 in the direction of the arrow B from the second to the first position the interrupt member 67 is operated by the ratchet member 76 which pivots the interrupt member 67 from the idle position to the interrupt position and retains the interrupt member 67 in the interrupt position for a sufficient period of time for extinguishing the flame in the flame combustion chamber 24.

Before describing the ratchet member 76 in further detail, the remaining details of the interrupt member 67 will first be described.

The mounting screw 68 terminates in a threaded portion 78 which engages a threaded bore 79 in the carrier housing 70, see FIGS. 1 and 16. A head 80 on the mounting screw 68 retains a plane bearing member 81 on the mounting screw 68 about which the interrupt member 67 is pivotal. A torsion spring 82 which is carried on a shoulder 83 of the bearing member 81 acts between a pin 74 extending from the carrier housing 70 and the interrupt disc 69 for spring urging the interrupt member 67 into the idle position.

Figure 7:
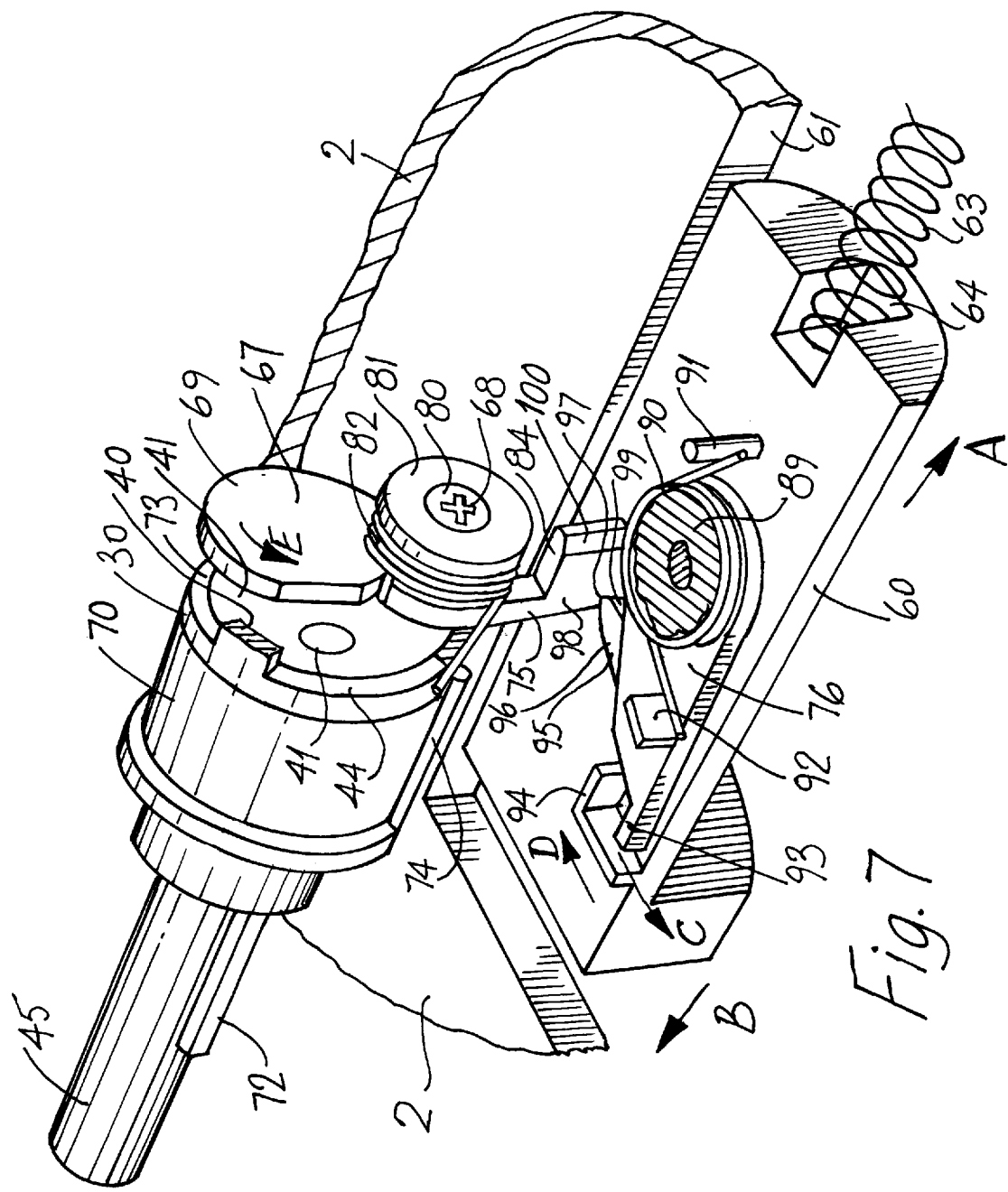
FIG. 7 is a view similar to FIG. 6 with part of the portion in a different position.
Figure 8:
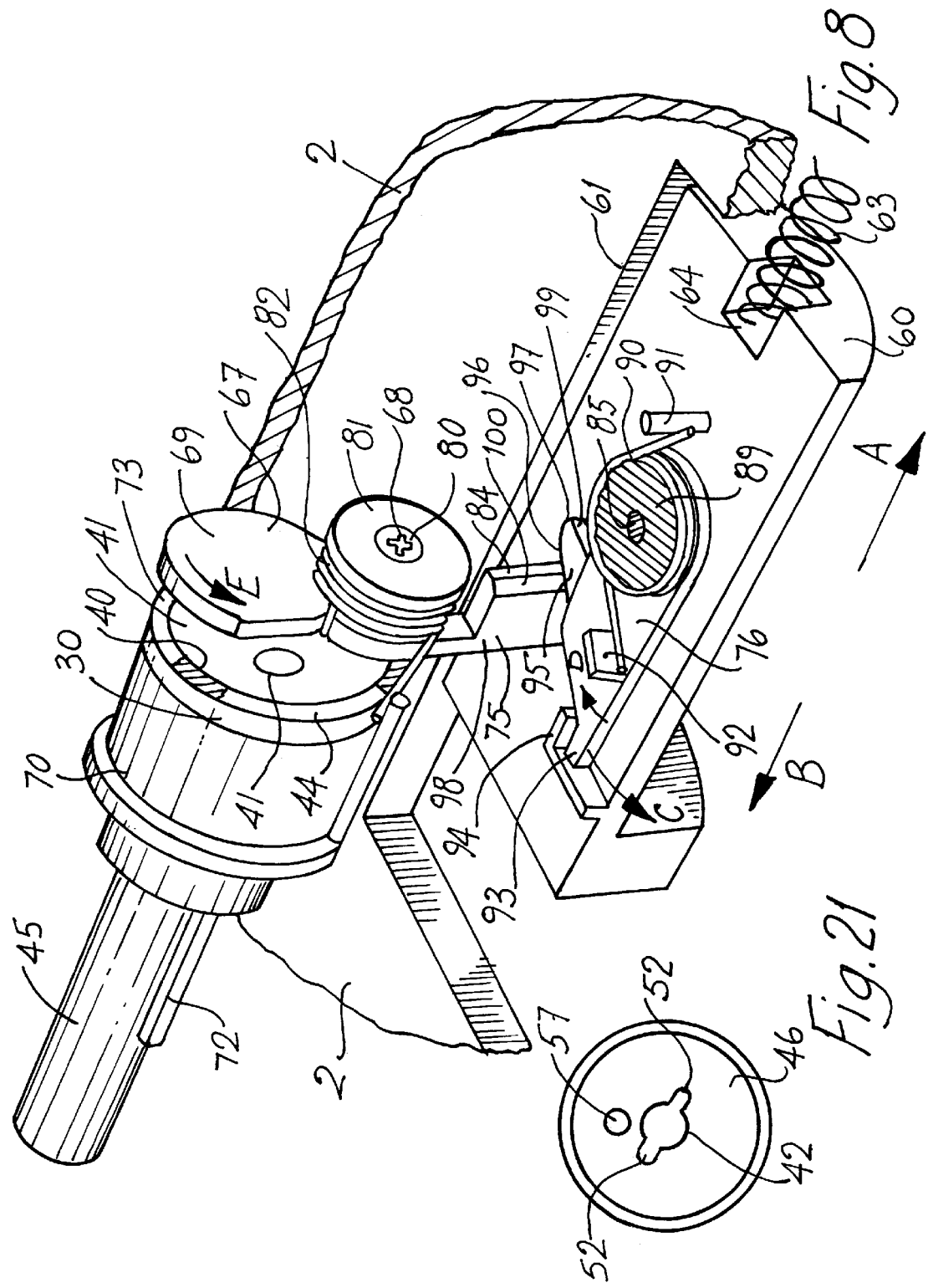
FIG. 8 is a view similar to FIG. 6 with the part of the portion in a further different position.
Figure 9:
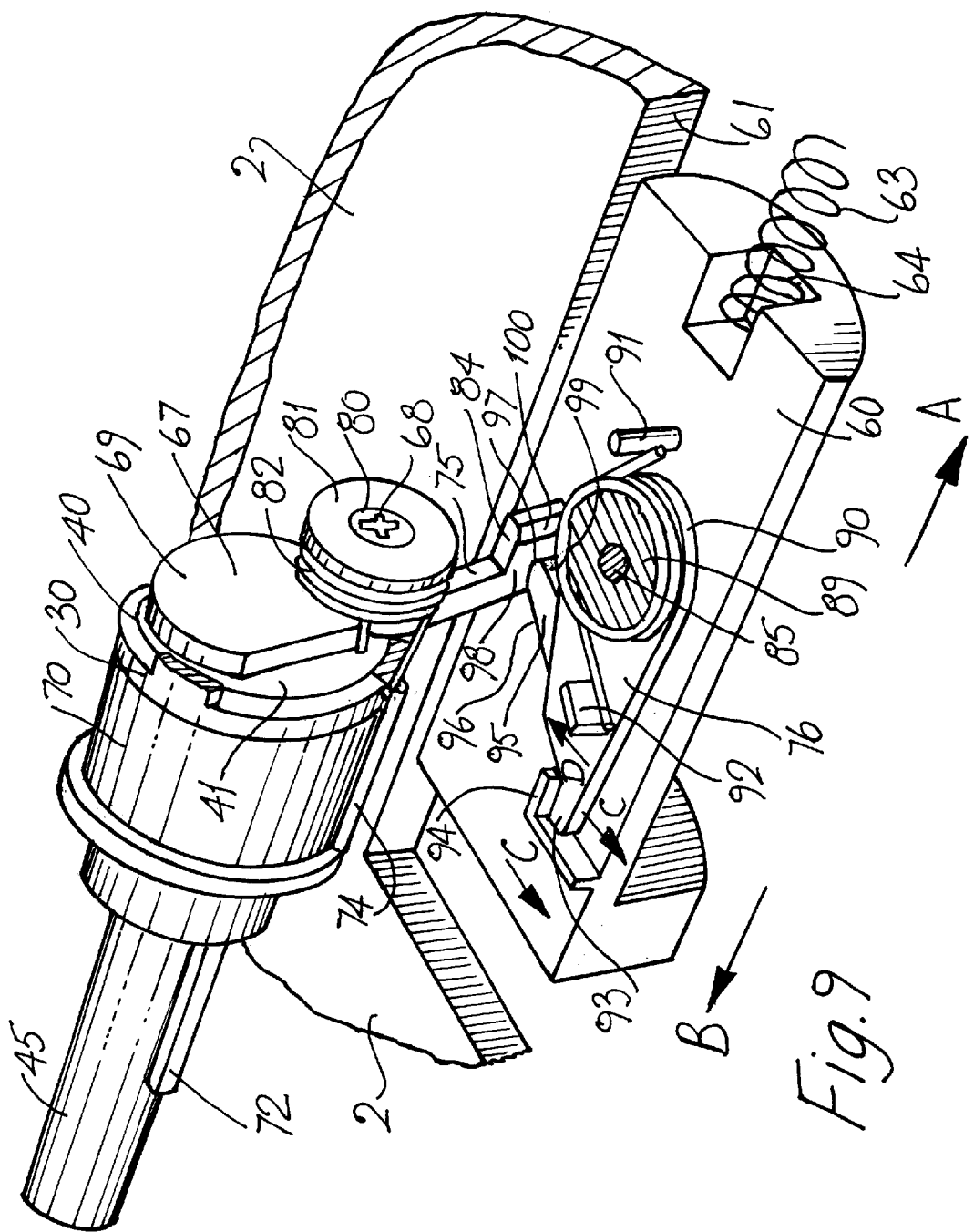
FIG. 9 is a view similar to FIG. 6 with the part of the portion in a still further different position.

Returning now to the ratchet member 76, the ratchet member 76 is of plastics material and is pivotally mounted on the actuator member 60 by a carrier screw 85. The carrier screw 85 terminates in a threaded portion 86 which engages a threaded bore 87 in the actuator member 60, see FIG. 17. A head 88 on the carrier screw 85 retains a plane bearing member 89 on the carrier screw 85 for pivotally carrying the ratchet member 76. A torsion spring 90 which is carried on a shoulder 77 of the bearing member 89 acts between a post 91 on the actuator member 60 and a lug 92 extending from the ratchet member 76 (see FIGS. 14 and 15) for urging the ratchet member 76 into an operable position illustrated in FIGS. 6, 8, 9 and 14. In the operable position, a limit member 93 extending from the ratchet member 76 tightly abuts a stop post 94 extending from the actuator member 60. An operating tongue 95 extends from the ratchet member 76 for co-operating with the operating lever 75 of the interrupt member 67 with a ratchet type action for pivoting the interrupt member 67 into the interrupt position. The ratchet member 76 is pivotal from the operable position into an inoperable position as illustrated in FIG. 7, in the direction of the arrow C to prevent pivoting of the interrupt member 67 when the actuator member 60 is being moved in the direction of the arrow A, so that as the actuator member 60 is being moved in the direction of the arrow A the interrupt member 67 remains undisturbed in the idle position. The torsional spring force in the torsion spring 90 is sufficiently less than the torsional spring force in the torsion spring 82 such that the ratchet member 76 pivots into the inoperable position as the actuator member 60 is moving in the direction of the arrow A and the interrupt member 67 remains undisturbed in the idle position. This is described in more detail below.

By virtue of the fact that the venturi housing 30 and the carrier housing 70 are prevented from rotating about their common axis relative to the main housing 2, the position of the interrupt member 67 relative to the ratchet member 76 about the axis of the venturi housing 30 is fixed, and on engagement of the tongue 95 with the operating lever 75 and the flange 84 one or other of the interrupt members 67 and the ratchet member 76 pivots about the corresponding axis defined by the mounting screw 68 and the carrier screw 85. The tongue 95 is provided with a camming surface formed by a first abutment face 96 and a second abutment face 97 for co-operating with a camming surface of the interrupt member 67, which is provided by a third abutment face 98 formed on the operating lever 75 and a flange 84. A fourth abutment face 99 is provided on the tongue 95. The fourth abutment face 99 extends substantially at right angles to the axis of the main housing 2 when the ratchet member 76 is in the operable position. On engagement of the fourth abutment face 99 with the operating lever 75 when the actuator member 60 is moving in the direction of the arrow A, a turning moment is induced in the ratchet member 76 which tends to urge the ratchet member 76 in the direction of the arrow C into the inoperable position. Since the torsional spring force in the torsion spring force 90 is less than the torsional spring force in the torsion spring 82, the ratchet member 76 is pivoted into the inoperable position, thereby leaving the interrupt member 67 undisturbed, see FIG. 7. On the operating tongue 95 clearing the third abutment face 98 of the operating lever 75 and the flange 84 as the actuator member 60 approaches the second position, the ratchet member 76 pivots in the direction of the arrow D and returns to the operable position, see FIG. 8. Return movement of the actuator member 60 from the second position in the direction of the arrow B causes the first abutment face 96 of the tongue 95 to engage the flange 84 extending from the operating lever 75. This induces a turning moment in the ratchet member 76 which would tend to turn the ratchet member 76 in the direction of the arrow D. However, since the ratchet member 76 is in the operable position with the limit member 93 engaging the stop post 94 further movement of the actuator member 60 in the direction of the arrow B causes the interrupt member 67 to pivot in the direction of the arrow E into the interrupt position, see FIGS. 5 and 9. The second abutment face 97 engaging the third abutment face 98 of the flange 84 and the operating lever 75 retains the interrupt member 67, and in turn, the interrupt disc 69 in the interrupt position until the operating tongue 95 clears the flange 84 and the operating lever 75 as the actuator member approaches the first position, at which stage the interrupt member 67 returns to the idle position under the action of the torsion spring 82, see FIG. 6. Accordingly, the actuator member sequentially operates the piezo electric ignition element 50 and the interrupt member 67 as the actuator member 60 moves from the first position in the direction of the arrow A through the second position and returns in the direction of the arrow B to the first position. A tapered lead-in 100 is provided on the flange 84 for engaging the first abutment face 96 of the ratchet member 76.

The length a of the third abutment face 98 of the operating lever 75 and the flange 84 in the axial direction relative to the main housing 2, and the arrangement of the first and second abutment faces 96 and 97 are such and are matched so that the interrupt disc 69 is temporarily retained in the interrupt position for a time period which is just sufficient for extinguishing the flame from the jet outlet 21 when the actuator member 60 is being operated normally with the operator's thumb on the actuator member 60 while the actuator member 60 is returning in the direction of the arrow B from the second to the first position. The strength of the compression spring 63 for returning the actuator member 60 in the direction of the arrow B to the first position is also matched with the first, second and third abutment faces 96, 97 and 98 to further ensure that the interrupt disc 69 is retained in the interrupt position for the time period which is just sufficient to extinguish the flame from the jet outlet 21 when the actuator member 60 is being operated normally with the operator's thumb on the actuator member 60 as it is being returned in the direction of the arrow B from the second to the first position. Additionally, the actuator member 60 and the piezo electric ignition element 50 and the ratchet member 76 are arranged so that a sufficient time elapses between the time the flame is ignited and extinguished for bringing the catalytic element 14 to its ignition temperature when the actuator member 60 is being operated normally with the thumb of the operator on the actuator member 60 at all times during operation thereof in the direction of the arrows A and B. The relationship between the actuator member 60 and the piezo electric ignition element 50 is such that the piezo electric element 50 is activating just after movement of the actuator member 60 has commenced in the direction of the arrow A from the first to the second position. The relationship between the ratchet member 76 on the actuator member 60 and the interrupt member 67 is such that the actuator member 60 must travel some distance in the direction of the arrow B from the second position towards the first position before the ratchet member 76 engages the interrupt member 67 for pivoting the interrupt member 67 into the interrupt position.

Normal operation of the actuator member 60 requires the operator to place his or her thumb on the actuator member 60 while gripping the handle 3 adjacent the reservoir 4. The actuator member 60 is moved in the direction of the arrow A from the first to the second position by the operator's thumb, and on reaching the second position is retained for a relatively short period of time and then returned from the second to the first position in the direction of the arrow B with the operator's thumb still in position on the actuator member 60. It is recommended that the actuator member 60 be retained in the second position for a short period of time, typically one second or less, to allow the flame sufficient time to raise the temperature of the combustion element 14 to its ignition temperature. Indeed, in many cases, it may not be necessary to retain the actuator member 60 in the second position.

The return of the actuator member 60 from the second to the first position is slightly retarded by the action of the operator's thumb on the actuator member 60. This ensures that the interrupt member 67 will remain in the interrupt position for a sufficient time period for extinguishing the flame. Additionally, the retarded return of the actuator member 60 further increases the time period during which the flame is played on the combustion element 14 for raising the temperature thereof to its ignition temperature.

In this embodiment of the invention, it has been found that by allowing the fuel gas to burn with a flame for a period of between one to five seconds is quite adequate for the purpose of raising the combustion element 14 to its ignition temperature. Indeed, in general, a period between one and two seconds is sufficient. However, it will be appreciated that the time period during which the gas/air mixture remains burning with a flame will depend on the type of catalytic combustion element being used and on its ignition temperature. It is also important that the interrupt time period, while it should be sufficient to extinguish the flame, should not be excessive so as to allow the combustion element 14 to drop below its ignition temperature before delivery of the gas/air mixture is reinstated to the combustion element.

As soon as the flame has been extinguished, and the interrupt member 67 has returned to the idle position flow of the gas/air mixture is reinstated and the gas/air mixture flows through the jet outlet 21 into the combustion chamber 11 where the gas catalytic combustion element 14 still at or above its ignition temperature commences to convert the gas flamelessly to heat.

Returning now to the tip retention housing 6, and referring to FIG. 1, the tip retention housing 6 comprises an outer tubular member 108 of stainless steel and of circular cross-section which terminates at one end in an inwardly extending annular flange 109 and at the other end in an outwardly extending annular flange 110. The inwardly directed flange 109 engages a shoulder 111 formed by an outwardly extending annular flange 112 which extends from the combustion chamber housing 10. A gland nut 113 of stainless steel engages the outward flange 110 and secures the tubular member 108 to the main housing 2. The gland nut 113 engages a threaded sleeve 114 of stainless steel which is secured to a threaded spigot 115 extending from the end cap 46. The threaded sleeve 114 is internally threaded for engaging the spigot 115, and is externally threaded for engaging the gland nut 113. A tubular spacer member 117 of stainless steel and of circular cross-section extends between a shoulder 118 on the threaded sleeve 114 and the jet housing carrier 47 so that on tightening the gland nut 113 the tubular member 108 co-operates with the sleeve 25, the jet housing carrier 47 and the spacer member 117 for tightly retaining the working body member 5 connected to the main housing 2. By releasing the gland nut 113 from the threaded sleeve 114, the soldering body member 5, and the catalytic element 14 can be readily removed and replaced.

A filler valve (not shown) for recharging the reservoir 4 is located in an end cap 119 of the main housing 2 which closes the reservoir 4. Such filler valves will be well known to those skilled in the art.

Although not illustrated, the operating slider 36 is provided with side grooves similar to the side grooves 62 of the actuator member 60 which slidably engage longitudinal side edges of the slot 37.

In use, the operator grips the handle 3 by hand holding the hand 3 adjacent the reservoir 4 in the palm of the hand. The gas supply control mechanism is operated for delivering fuel gas through the nozzle bore 28 by sliding the operating slider 36 in the direction of the arrow X. The operating slider 36 is moved by the operator's thumb. Air is mixed with the fuel gas stream in the main bore 40 and the tapered bore 41 of the venturi housing 30. The gas/air mixture is delivered through the supply pipe 34 and exits through the jet outlet 21. The operator then places his or her thumb on the actuator member 60 and with the thumb moves the actuator member 60 from the first position in the direction of the arrow A to the second position against the action of the compression spring 63. As the actuator member 60 moves from the first position the piezo electric ignition element 50 is activated for generating a spark across the spark gap 56. The spark ignites the gas/air mixture exiting through the jet outlet 21 which burns with a flame in the flame combustion chamber 24. The flame is directed into and plays on the combustion element 14, for raising the temperature of the combustion element 14 to its ignition temperature. On the operator having moved the actuator member 60 to the second position, the operator retains the actuator member 60 for a short period of time, typically one second before allowing the actuator member 60 to return in the direction of the arrow B to the first position with the operator's thumb still in place on the actuator member 60. As the actuator member 60 is returning in the direction of the arrow B, the ratchet member 76 co-operates with the interrupt member 67 for pivoting the interrupt member 67, and in turn, the interrupt disc 69 temporarily into the interrupt position for interrupting the fuel gas stream issuing from the nozzle bore 28 for extinguishing the flame in the flame combustion chamber 24. By the time the ratchet member 76 engages the interrupt member 67 the flame will have raised the temperature of the combustion element 14 to its ignition temperature. By the time the ratchet member 76 has passed the interrupt member 67 moving in the direction of the arrow B, and has disengaged the interrupt member 67 for allowing the interrupt member 67 to return to the idle position, the flame will have been extinguished. On the interrupt member 67 returning to the idle position, the fuel gas stream is reinstated through the main bore 40 of the venturi housing, and is mixed with air in the venturi housing 30. The gas/air mixture is delivered through the jet outlet 21, through the flame combustion chamber 24 into the combustion chamber 11 where it is converted to heat by flameless combustion by the combustion element 14. Heat from the combustion element 14 is transferred into the soldering tip 8 through the spigot 15 and the combustion chamber housing 10.

While in all cases the entire combustion element 14 will not be raised to its ignition temperature by the flame, once a small portion of the combustion element 14 is raised to its ignition temperature by the flame, on the flame being extinguished and the gas/air mixture being reinstated and being delivered to the combustion element 14 while the combustion element 14 is still above its ignition temperature, the entire combustion element 14 will rapidly be raised to its ignition temperature.

When the soldering operation has been completed, the gas supply to the nozzle bore 28 is switched off by operating the isolating valve (not shown) in the gas supply control mechanism 27 by sliding the operating slider 36 in the direction of the arrow Y.

It should be noted that the interrupt disc 69 when in the interrupt position does not seal the nozzle bore 28 in order to prevent the flow of fuel gas from the nozzle bore 28. Rather, the interrupt disc 69 when in the interrupt position extends into the stream of fuel gas flowing through the main bore 40 of the venturi housing 30 and deflects the fuel gas stream. This is sufficient interruption of the fuel gas stream for extinguishing the flame in the flame combustion chamber 24.

While the gas powered heating tool has been described as being a soldering tool, the gas powered heating tool may be provided with other working body members besides a working body member which forms a soldering tip. It will be appreciated that the heating tool may be provided with a number of different types of working body members which would be selectively replaceable. For example, it is envisaged that one of the working body members may be a heated knife, another working body member may be a hot plate of a clothes iron, in another case, the working body member may comprise a chamber for receiving glue so that the heating tool may be used as a glue gun for hot melt glues, and in certain cases it is envisaged that the heating tool would be arranged to provide a hot air blow.

It is envisaged that while the heating tool has been described as comprising a specific type of gas catalytic combustion element, other suitable gas catalytic combustion elements may be provided. For example, it is envisaged that a ceramics gas catalytic combustion element may be used, and in other cases, it is envisaged that the catalytic combustion element would be provided with a substrate formed of a mesh material onto which the catalytic material would be deposited. Such a mesh material may be a wire mesh, a fibreglass mesh, a gauze, or any other desired mesh material.

While the soldering iron has been described as comprising a fuel gas reservoir mounted in the handle, while this is preferable, it is not essential. Fuel gas may be supplied to the gas supply control mechanism direct from a remotely located source.

Furthermore, while a particular shape and construction of combustion chamber for the gas catalytic combustion element has been provided, any other suitable shape and construction of combustion chamber may be provided, and it will also be appreciated that other shapes and construction of flame combustion chamber may be provided, and indeed, in certain cases, the flame combustion chamber may be omitted. In which case, the jet means would be located substantially adjacent the inlet to the combustion chamber of the catalytic combustion element, and the gas/air mixture would be burnt with a flame directly in the combustion chamber for housing the catalytic combustion element. It will also of course be appreciated that other shapes and construction of soldering body member and working body member may be provided. Needless to say, other suitable connecting arrangements for connecting the working body member to the main housing may be provided.

While the gas powered heating tool has been described as being a portable hand held gas powered soldering iron, it is not essential that the tool be portable or hand held.

Needless to say, it will be appreciated that the ignition apparatus according to the invention may be used in other tools, devices and apparatus besides gas powered heating tools.

What is claimed is:

1. An ignition apparatus for raising the temperature of a gas catalytic combustion element (14) of a gas powered heating device to its ignition temperature, wherein the heating device comprises:

a jet means (21) for delivering fuel gas to the gas catalytic combustion element (14) in gaseous form, for conversion to heat by the gas catalytic combustion element (14), the jet means (21) being located relative to the gas catalytic combustion element (14) for directing a flame at the gas catalytic combustion element (14) for raising the temperature of the gas catalytic combustion element (14) to its ignition temperature, and a means (4) for supplying a stream of fuel gas in gaseous form to the jet means (21), the ignition apparatus comprising:

an ignition means (50,55) located adjacent the jet means (21) for igniting the fuel gas from the jet means (21) to burn with a flame, a flame extinguishing means (67) provided by an interrupt means (67) for temporarily interrupting the flow of fuel gas to the jet means (21) for extinguishing the flame when the gas catalytic combustion element (14) has been raised to its ignition temperature, the interrupt means (67) being located upstream of the jet means (21) adjacent the fuel gas stream, and being moveable from an idle position spaced apart from the fuel gas stream to a temporary interrupt position whereby the interrupt means (67) extends into the fuel gas stream for interrupting the fuel gas stream, and an actuator means (60) located on the heating device and being cooperable with the ignition means (50,55) and the interrupt means (67), the actuator means (60) being operable for sequentially operating the ignition means (50,55) for igniting the fuel gas stream to burn with a flame and the interrupt means (67) for urging the interrupt means (67) temporarily into the interrupt position for temporarily interrupting the flow of fuel gas to the jet means (21).

2. Ignition apparatus as claimed in claim 1 characterised in that the actuator means (60) is operable in a first direction for operating the ignition means (50) and is operable in a reverse second direction for operating the interrupt means (67).

3. Ignition apparatus as claimed in claim 1 characterised in that the actuator means (60) co-operates with the interrupt means (67) with a ratchet type action so that movement of the actuator means (60) in the first direction for operating the ignition means (50) leaves the interrupt means (67) substantially undisturbed in the idle position, and movement of the actuator means (60) in the second direction operates the interrupt means (67).

4. Ignition apparatus as claimed in claim 3 characterised in that a ratchet member (76) is carried on the actuator means (60), the ratchet member (76) being engagable with the interrupt means (67) when the actuator means (60) is being moved in the second direction for moving the interrupt means (67) from the idle position to the interrupt position.

5. Ignition apparatus as claimed in claim 4 characterised in that the ratchet member (76) is movably mounted on the actuator means (60) and is urged into an operable position for engaging the interrupt means (67) on the actuator means (60) being moved in the second direction, the ratchet member (76) being movable from the operable position to an inoperable position on engagement with the interrupt means (67) on the actuator means (60) being moved in the first direction for leaving the interrupt means (67) substantially undisturbed in the idle position.

6. Ignition apparatus as claimed in claim 5 characterised in that the ratchet member (76) is spring urged into the operable position, and the interrupt means (67) is spring urged into the idle position, the urging force urging the ratchet member (76) into the operable position being less than the urging force urging the interrupt means (67) into the idle position so that on the ratchet member (76) engaging the interrupt means (67) on the actuator means (60) being moved in the first direction the ratchet member (76) is moved into the inoperable position.

7. Ignition apparatus as claimed in claim 4 characterised in that the ratchet member (76) is pivotally mounted on the actuator means (60), and the interrupt means (67) is pivotally mounted about a pivot axis (68) extending substantially parallel to the fuel gas stream and spaced apart therefrom, and is pivotal about the pivot axis (68) from the idle position to the interrupt position, the interrupt means (67) comprising a plate member (69) extending transversely relative to the fuel gas stream.

8. Ignition apparatus as claimed in claim 4 characterised in that an operating lever (75) extends from the interrupt means (67) for co-operating with the ratchet member (76) for moving the interrupt means (67) from the idle position to the interrupt position, the operating lever (75) and the ratchet member (76) being provided with respective co-operating surfaces (98,96,97) for co-operating with each other for moving the interrupt means (67) from the idle position to the interrupt position, and for retaining the interrupt means (67) in the interrupt position for a time period sufficient to extinguish the flame.

9. Ignition apparatus as claimed in claim 1 characterised in that the ignition means (50) comprises at least one electrode (55) adjacent the jet means (21) and an electrical power supply means (50) for delivering an electrical power supply to the at least one electrode (55) for causing an electrically generated spark at the electrode (55), the electrical power supply means (50) being responsive to the actuator means (60) being moved in the first direction, and the electrical power supply means (50) comprises a piezo electric element (50), the actuator means (60) being operably connected to the piezo electric element (50) for compressing the piezo electric element (50) for compressing the piezo electric (50) for generating the electrical power supply.

10. Ignition apparatus as claimed in claim 9 characterised in that the jet means (21) is of electrically conductive material, and is electrically connected to the electrical power supply means (50), the electrode (55) and the jet means (21) forming a spark gap (56) across which the spark jumps.

11. Ignition apparatus as claimed in claim 1 characterised in that the ignition apparatus comprises a housing (2,6), the jet means (21), the ignition means (50) and the interrupt means (67) being located in the housing, the actuator means (60) being provided by an actuator member (60) slidably mounted in the housing (2) and accessible externally of the housing (2) for operating the ignition means (50) and the interrupt means (67).

12. Ignition apparatus as claimed in claim 1 characterised in that a nozzle means (28) is provided for supplying the fuel gas stream in gaseous form into a pipe means (34) for supply to the jet means (21), the interrupt means (67) being located adjacent the nozzle means (28) and slightly downstream thereof.

13. Ignition apparatus as claimed in claim 12 characterised in that the pipe means (34) is spaced apart from the nozzle means (28), and the interrupt means (67) is located adjacent the nozzle means (28), and extends between the nozzle means (28) and the pipe means (34) in the interrupt position, air being drawn into and mixed with the fuel gas stream intermediate the nozzle means (28) and the pipe means (34).

14. A gas powered heating tool comprising:
a working body member (5) of heat conductive material,
a combustion chamber housing (10) extending from the working body member (5) forming a combustion chamber (11), and having a gas inlet (18) to the combustion chamber (11) and an exhaust outlet (19) from the combustion chamber (11),
a gas catalytic combustion element (14) mounted in the combustion chamber (11),
a jet means (21) for delivering fuel gas to the gas catalytic combustion element (14) in gaseous form, for conversion to heat by the gas catalytic combustion element (14), the jet means (21) being located relative to the gas catalytic combustion element (14) for directing a flame at the gas catalytic combustion element (14) for raising the temperature of the gas catalytic combustion element (14) to its ignition temperature, and
a means (4) for supplying a stream of fuel gas in gaseous form to the jet means (21), the ignition apparatus comprising:
an ignition means (50,55) located adjacent the jet means (21) for igniting the fuel gas form the jet means (21) to burn with a flame,
a flame extinguishing means (67) provided by an interrupt means (67) for temporarily interrupting the flow of fuel gas to the jet means (21) for extinguishing the flame when the gas catalytic combustion element (14) has been raised to its ignition temperature, the interrupt means (67) being located upstream of the jet means (21) adjacent the fuel gas stream, and being moveable from an idle position spaced apart from the fuel gas stream to a temporary interrupt position whereby the interrupt means (67) extends into the fuel gas stream for interrupting the fuel gas stream, and
an actuator means (60) located on the heating device and being cooperable with the ignition means (50,55) and the interrupt means (67), the actuator means (60) being operable for sequentially operating the ignition means (50,55) for igniting the fuel gas stream to burn with a flame and the interrupt means (67) for urging the interrupt means (67) temporarily into the interrupt position for temporarily interrupting the flow of fuel gas to the jet means (21).

15. A gas powered heating tool as claimed in claim 14 characterised in that the jet means (21) is located upstream of the gas inlet (18) to the combustion chamber (11), and the jet means (21) delivers a fuel gas/air mixture into the combustion chamber (11).

16. A gas powered heating tool as claimed in claim 14 characterised in that the gas powered heating tool comprises a handle (2), the working body member (5) being connected to the handle (2).

17. A gas powered heating tool as claimed in claim 16 characterised in that a fuel gas supply means (4) comprising a fuel gas reservoir (4) is located in the handle (2) for supplying the stream of fuel gas.

18. A gas powered heating tool as claimed in claim 14 characterised in that a control means (27,36) for controlling the flow of fuel gas to the nozzle means (28) is located in the handle (2), and the ignition apparatus is located in the handle (2).

19. A gas powered heating tool as claimed in claim 14 characterised in that the working body member (5) comprises a soldering body portion (8), the combustion chamber housing (10) extending rearwardly from the soldering body portion (8).

* * * * *